US012559996B2

(12) United States Patent
Pohl et al.

(10) Patent No.: US 12,559,996 B2
(45) Date of Patent: Feb. 24, 2026

(54) METHOD FOR OPERATING A MOTOR VEHICLE LOCKING SYSTEM

(71) Applicant: Brose Fahrzeugteile SE & Co. Kommanditgesellschaft, Bamberg, Bamberg (DE)

(72) Inventors: Florian Pohl, Ebersdorf (DE); Alexander Müller, Bischberg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 390 days.

(21) Appl. No.: 17/801,960

(22) PCT Filed: Feb. 25, 2021

(86) PCT No.: PCT/EP2021/054679
§ 371 (c)(1),
(2) Date: Sep. 8, 2022

(87) PCT Pub. No.: WO2021/170716
PCT Pub. Date: Sep. 2, 2021

(65) Prior Publication Data
US 2023/0128709 A1     Apr. 27, 2023

(30) Foreign Application Priority Data
Feb. 25, 2020     (DE) ..................... 10 2020 104 846.7

(51) Int. Cl.
B60R 25/40          (2013.01)
E05B 81/16          (2014.01)
(Continued)

(52) U.S. Cl.
CPC ............ E05B 81/82 (2013.01); B60R 25/403 (2013.01); E05B 81/16 (2013.01); E05B 81/86 (2013.01); E05B 83/34 (2013.01)

(58) Field of Classification Search
CPC .......... E05B 81/82; E05B 81/16; E05B 81/86; E05B 81/90; E05B 83/34; B60R 25/403
See application file for complete search history.

(56) References Cited

U.S. PATENT DOCUMENTS 11,280,121 B2 *   3/2022   Sardelli ................. E05B 15/004
2018/0043789 A1 *   2/2018   Goetz ............... H02M 3/33573
(Continued)

FOREIGN PATENT DOCUMENTS

DE       102015122443 A1     6/2017
DE       102018122443 A1     3/2019
(Continued)

OTHER PUBLICATIONS

Dictionary—Current Technical Terms from Computer Sciences and Telecommunications, 9th Edition, Zürich, VDF Hochschulverlag AG, 2007, p. 86. ISBN 978-3-7281-3108-9.

*Primary Examiner* — Kristina R Fulton
*Assistant Examiner* — Thomas L Neubauer
(74) *Attorney, Agent, or Firm* — Dickinson Wright PLLC

(57)          ABSTRACT

A method of operating a motor vehicle locking system including an electric drive for providing a locking function, a central battery of the motor vehicle supplies electrical energy to the electric drive during normal operation, an auxiliary energy supply supplies electrical energy to the central battery and is arranged in a closure arrangement of the motor vehicle, the closure element is configured to assume an open and a closed position. Access to the auxiliary energy supply is blocked by the closure element in the closed position and cleared in the open position. The central battery is monitored by a control unit to check whether an emergency operation criterion is satisfied. The closure element is locked in the closed position by means of a lock unit, and when the emergency operation criterion is satisfied, the (Continued)

lock unit is actuated by the control unit to unlock the closure element.

19 Claims, 1 Drawing Sheet

(51) Int. Cl.
  *E05B 81/82*    (2014.01)
  *E05B 81/86*    (2014.01)
  *E05B 83/34*    (2014.01)

(56)       References Cited

U.S. PATENT DOCUMENTS

| | | | |
|---|---|---|---|
| 2019/0284847 A1* | 9/2019 | Malvy | E05B 81/06 |
| 2019/0292828 A1* | 9/2019 | Liu | E05B 3/00 |
| 2020/0247261 A1* | 8/2020 | Kojima | H02J 7/00034 |
| 2021/0076960 A1* | 3/2021 | Fornwalt | G16H 50/20 |

FOREIGN PATENT DOCUMENTS

| | | | |
|---|---|---|---|
| DE | 102017125719 A1 | 5/2019 | |
| DE | 102018100551 A1 | 7/2019 | |
| JP | 2014118694 A | 6/2014 | |
| KR | 20170011652 A | 2/2017 | |
| WO | 9900572 A1 | 1/1999 | |

* cited by examiner

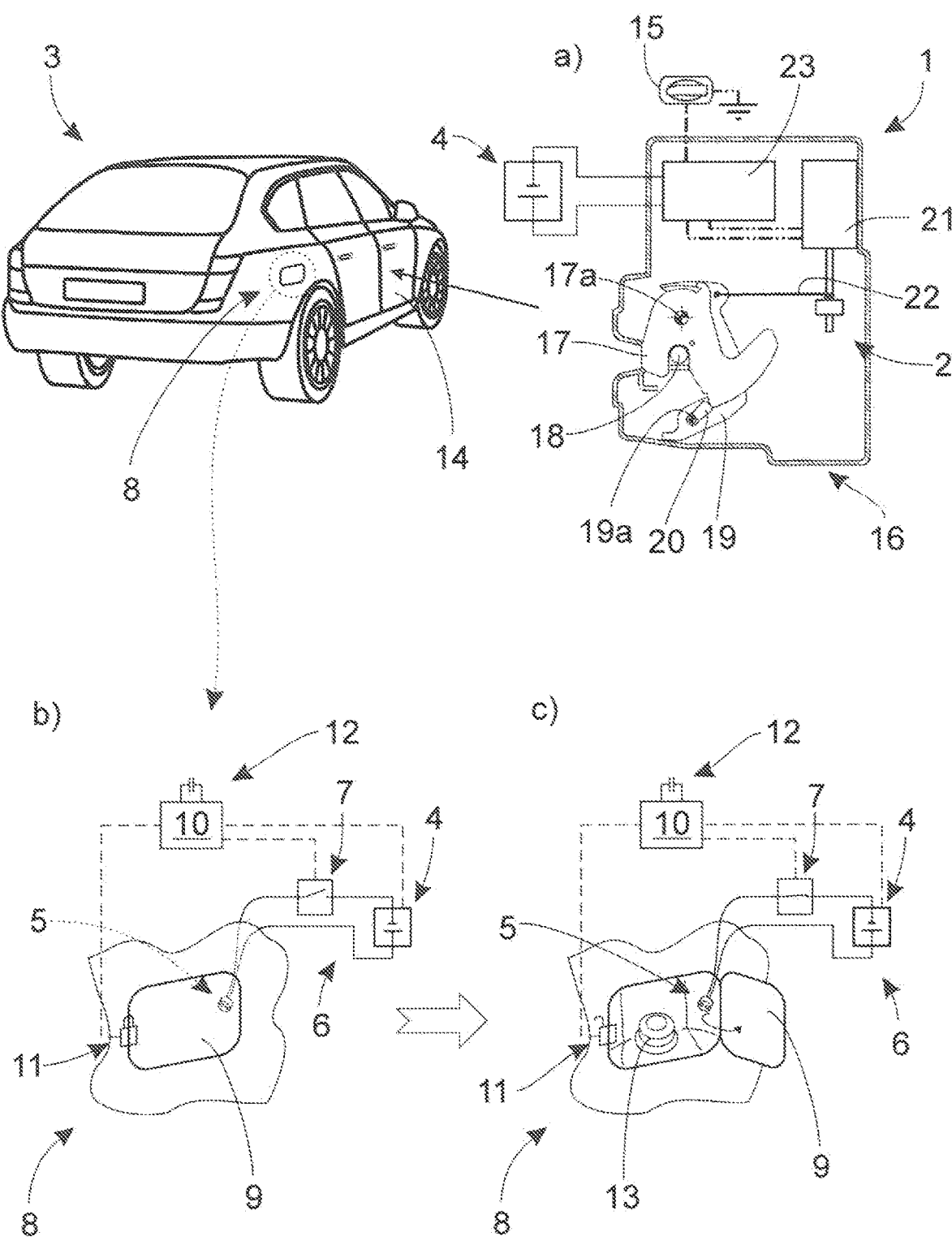

METHOD FOR OPERATING A MOTOR VEHICLE LOCKING SYSTEM

CROSS-REFERENCE TO RELATED APPLICATIONS

This application is the U.S. National Phase of PCT Application No. PCT/EP2021/054679 filed on Feb. 25, 2021, which claims priority to German Patent Application No. DE 10 202 010 4846.7, filed on Feb. 25, 2020, the disclosures of which are hereby incorporated in their entirety by reference herein.

TECHNICAL FIELD

The present disclosure relates to a method of operating a motor vehicle locking system.

BACKGROUND

The motor vehicle locking system in question has an electric drive for providing a motorized locking function of a motor vehicle, wherein a central battery of the motor vehicle supplies the electric drive with electrical energy in normal operation. Such a motor vehicle locking system may be used in all types of motorized locking functions for adjustment elements of a motor vehicle. These include, in particular, motor vehicle locking systems with motor vehicle locks. The term "adjustment element" refers, in particular, to doors, such as side doors, rear doors, tailgates, rear lids, hoods or the like, which may essentially be configured as swing doors or slide doors.

Motor vehicle locking systems may be operated for example with a motor vehicle lock which has a lock catch and a pawl as locking elements. The lock catch can be brought into a locking position, in which it is in holding engagement with a locking part, such as a locking bolt or the like, and in which it is held in position by the pawl. The motorized locking function may relate, for example, to an electrical opening of the motor vehicle lock. In this case, the motor vehicle lock is equipped with an electric drive with which the pawl can be released so that the lock catch may release the locking part. Likewise, the motorized locking function may relate to both a change in the locking state of the motor vehicle lock, such as an unlocking or locking, as well as a closing, of the motor vehicle lock. Moreover, the locking function may relate to a motorized adjustment, for example for an opening or closing movement of the adjustment element.

To take into account requirements relating to the reliability of the voltage supply of such motor vehicle locking systems, a mechanical redundancy may be provided. For example, in addition to the motorized release of the pawl, a mechanical actuating train for the pawl may be provided, which enables manual release of the pawl via an internal door handle. However, owing to the greater complexity of such motor vehicle locking systems, electrical motor vehicle locks without a mechanical redundancy have also become well established.

A challenging aspect of such motor vehicle locking systems consists in enabling the locking function to still be implemented in the event of a drop in the voltage supply, for instance in the event of a failure of the central battery of the motor vehicle.

SUMMARY

The invention is based on the problem of configuring and developing the known method for operating a motor vehicle locking system in such a way that the reliability of the motor vehicle locking system is further improved.

An important aspect is the basic consideration that, in the case of an auxiliary energy supply which is accessible from the outside and enables an electrical connection to the central battery and/or to the motor vehicle locking system, unauthorized access to the motor vehicle electronics is possible. The motor vehicle electronics are at risk of tampering, which may even result in damage to the electrical system of the motor vehicle.

It is assumed that the auxiliary energy supply is arranged in a closure arrangement of the motor vehicle with a closure element, wherein the closure element is designed to assume an open and a closed position, wherein access to the auxiliary energy supply is blocked by the closure element in the closed position and enabled in the open position.

Moreover, the central battery is monitored by a control unit to check whether an emergency operation criterion is met.

In one or more embodiments, the closure element, in a blocked state, is blocked in the closed position by means of a blocking unit, and that, when the emergency operation criterion is met, the blocking unit is activated by the control unit to unblock the closure element starting from the blocked state.

It is thus achieved that, in normal operation, the closure element may remain in the blocked state and access to the auxiliary energy supply is therefore impossible. In the blocked state, tampering with the motor vehicle electronics via the auxiliary energy supply is prevented. On the other hand, in the event of an emergency operation which necessitates access to the auxiliary energy supply, unblocking of the closure element is provided and the auxiliary energy supply may be made accessible.

In one or more embodiments, an electrical energy store for the blocking unit is provided, wherein the blocking unit is unblocked by means of the energy stored in the energy store. The unblocking procedure is therefore also ensured independently of the power supplied by the central battery. The energy store may be configured as a rechargeable energy store and is charged by means of the control unit in normal operation.

Since unblocking of the closure element may be performed promptly with the commencement of the emergency operation, only short lead times and small capacities of the energy store are required. Consequently, in one or more embodiments, an energy store having a capacitor, such as a ceramic capacitor, and/or a double layer capacitor may be advantageously used.

In one or more embodiments, the security with regard to unauthorized access to the vehicle electronics is further increased in that, in the blocked state, the auxiliary energy supply is electrically disconnected from the central battery and the motor vehicle locking system. When the emergency operation criterion is met, provision is made for the auxiliary energy supply to be electrically connected to the central battery and/or to the motor vehicle locking system by the control unit.

In one or more embodiments, the closure element may be formed, inter alia, as a flap, as a door, as a door operating element and/or as part of a motor vehicle external element of the motor vehicle.

In another embodiment, the closure element is designed to assume a pre-latching position as an open position. In emergency operation, the closure element may be transferred into the pre-latching position, with the transfer from the pre-latching position into a more open position being blocked. As an example, in emergency operation, for example, a door may be brought into the pre-latching position in order to enable access to the auxiliary energy supply, although full opening of the door is prevented as a security measure.

After the unblocking procedure, the closure element may remain in the closed position or be moved from the closed position into the pre-latching position or into the open position in a motorized manner via the blocking unit.

One or more definitions of the emergency operation criterion are described herein, such as a definition based on a specified time curve of a state variable of the central battery prevents false alerts.

In another embodiment, the blocking unit has a bistable blocking element, which, for unblocking purposes, is moved from a first stable position into a second stable position by an actuator.

In another embodiment, the auxiliary energy supply may be designed to supply electrical energy from an external energy source. Additionally or alternatively, the auxiliary energy supply may be designed to generate electrical energy from a movement of the auxiliary energy supply by the operator, whereby the need for an external energy source may be eliminated.

As already mentioned at the start, the motor vehicle locking system in in one or more embodiments, includes a motor vehicle lock for an adjustment element of the motor vehicle. The electric drive may be provided for the motorized release of the pawl, wherein, in the present case, electrical opening of the motor vehicle lock is also possible in emergency operation.

In one or more embodiments, the electric drive may also be provided to change the locking state of the motor vehicle lock within the context of the locking function and/or to close the motor vehicle lock within the context of the locking function.

In yet another embodiment, the motorized locking function, which is also enabled in emergency operation is provided in that the electric drive is provided for motorized adjustment of the adjustment element of the motor vehicle.

According to yet another embodiment, which has independent importance, a motor vehicle for implementing the proposed method is claimed. With regard to this further teaching, please refer to all explanations relating to the proposed method.

BRIEF DESCRIPTION OF THE DRAWINGS

The invention is explained in more detail below with the aid of drawing, which merely illustrates an exemplary embodiment. In the drawing:

FIG. 1 shows a schematic perspective illustration of a motor vehicle for implementing the proposed method, with an auxiliary energy supply in a closure arrangement.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known method of operating a motor vehicle locking system is provided in DE 10 2017 125 719 A1, the method relates to an auxiliary energy supply for the motor vehicle locking system, which auxiliary energy supply is arranged, for example, behind a cap for a locking cylinder of the motor vehicle locking system. The auxiliary energy supply is accessible from the outside and serves to supply electrical energy to the motor vehicle locking system so that, in emergency operation, an external energy source may be connected to the auxiliary energy supply in order to operate the motor vehicle locking system and to trigger an electrical opening procedure.

The present disclosure relates to a method for operating a motor vehicle locking system 1, wherein the motor vehicle locking system 1 has an electric drive 2 for providing a motorized locking function (explained further below) of a motor vehicle 3.

The motor vehicle locking system 1 may be a motor vehicle locking system 1 without mechanical redundancy, wherein the locking function may be provided merely via the electric drive 2.

A central battery 4 of the motor vehicle 3 supplies the electric drive 2 with electrical energy in normal operation. The central battery 4 may be the battery which also provides the electrical energy required for starting the motor vehicle 3 and/or for the electric traction drive of the motor vehicle 3.

An auxiliary energy supply 5 for supplying electrical energy to the central battery 4 is provided. In this case, the auxiliary energy supply 5 is connected to the central battery 4 via an electric line 6, which may be closed via a switch 7. Alternatively or additionally, the auxiliary energy supply 5 may serve to supply electrical energy to the motor vehicle locking system 1. In general, the auxiliary energy supply 5 also enables the motor vehicle locking system 1 to be operated in the event of a failure of the central battery 4.

The auxiliary energy supply 5 is arranged in a closure arrangement 8 of the motor vehicle 3 with a closure element 9, wherein the closure element 9 is designed to assume a closed position (shown in FIG. 1b) and an open position (shown in FIG. 1c). In this case, the closure element 9 is pivotally arranged on the motor vehicle body, wherein a longitudinally displaceable closure element 9, for example, is also conceivable.

Access to the auxiliary energy supply 5 is blocked by the closure element 9 in the closed position and enabled in the open position. In this case, blocking the access means that, owing to the spatial arrangement of the auxiliary energy supply 5, a user is not able to use the auxiliary energy supply 5 without moving the closure element 9. In the present case, the closure arrangement 8 forms a space which is only accessible via an external opening. In the closed position, the closure element 9 covers this opening substantially entirely, so that access to the auxiliary energy supply 5 is only possible if the closure element 9 has been opened from the closed position, as illustrated by FIGS. 1b) and c).

The central battery 4 is monitored by a control unit 10 to check whether an emergency operation criterion is met. In general, the emergency operation criterion, which is explained further below, represents a state of the central battery 4 in which the supply to the motor vehicle locking system 1 is no longer reliably ensured and access to the auxiliary energy supply 5 is therefore necessary. The control unit 10 may be a separate control unit associated with the auxiliary energy supply 5, as illustrated in FIG. 1. Likewise, the control unit 10 may be associated with a central motor vehicle control (not illustrated here).

An important aspect now is that the closure element 9, in a blocked state, is blocked in the closed position by means of a blocking unit 11.

The blocked state of the closure element 9 and the blocking unit 11 is shown accordingly in FIG. 1b). In the blocked state, the closure element 9 is immobilized by the blocking unit 11 in order to prevent opening of the closure element 9 and therefore access to the auxiliary energy supply 5.

The blocked state of the closure element 9 and the blocking unit 11 may be realized at least when the motor vehicle locking system 1 as a whole is in the "locked" locking state and/or "anti-theft" locking state. In a further configuration the blocked state of the closure element 9 and the blocking unit 11 is always realized in normal mode, which means that a relatively high level of security against unauthorized access to the auxiliary energy supply 5 is achieved.

An important aspect, moreover, is that, when the emergency operation criterion is met, the blocking unit 11 is actuated by the control unit 10 to unblock the closure element 9, starting from the blocked state.

With the unblocking procedure, the closure element 9 assumes an unblocked state. With the exception of unavoidable delays, related for example to the control technology, the unblocking procedure may take place immediately once the emergency operation criterion is met, whereby, with the commencement of the emergency operation, it is ensured that the closure element 9 is unblocked.

In a further configuration, when the emergency operation criterion is met, the blocking unit 11 is only activated by the control unit 10 when at least one further criterion, for example an authentication criterion, is met. When checking the authentication criterion, the control unit 10 may query whether an authentication unit, for instance a transmitter for keyless access, is present. In a further configuration, however, the emergency operation criterion provides sufficient basis for actuating the blocking unit 11 for unblocking purposes. The method is thereby further simplified and the energy consumption in emergency operation is reduced.

It is conceivable that, for unblocking purposes, the blocking unit 11 is likewise supplied with energy from the central battery 4, wherein the emergency operation criterion is selected such that, even with the transition to the emergency operation, there is still sufficient energy in the central battery 4 to induce the unblocking procedure. According to another configuration, however, an electrical energy store 12 is provided for the blocking unit 11. The blocking unit 11 is unblocked by means of the energy stored in the energy store 12. The control unit 10 may likewise be supplied by the energy store 12.

The energy store 12 may be configured as a rechargeable energy store and is charged by means of the control unit 10 in normal operation, in this case using the energy stored in the central battery. The rechargeable energy store may have at least one electrochemical primary and/or secondary cell. In this case, and preferably, the energy store 12 comprises a capacitor, preferably a ceramic capacitor and/or a double layer capacitor. In the case of a double layer capacitor, the energy is stored in an electrochemical double layer, which is also known as a "Helmholtz layer" ("Lexikon—Aktuelle Fachbegriffe aus Informatik and Telekommunikation" ["Lexicon of current technical terms from computer science and telecommunications"], 8th edition, 2007, VDF Hochschulverlag AG, page 86). Such a double layer capacitor is also known as a "super capacitor", "supercap", "ultracap" or the like. A double layer capacitor may provide high power densities for unblocking the closure element 9.

According to a further configuration, in the blocked state, the auxiliary energy supply 5 is electrically disconnected from the central battery 4 and the motor vehicle locking system 1. In this case, the above-mentioned switch 7 is provided, which is open in the blocked state shown in FIG. 1b, and is actuated by the control unit 10. The switch 7 may be designed as a semiconductor component. In principle, however, further configurations are conceivable for electrically disconnecting the auxiliary energy supply 5, for instance circuitry-wise, from the central battery 4 and the motor vehicle locking system 1 in the blocked state. In this case, when the emergency operation criterion is met, the auxiliary energy supply 5 is electrically connected to the central battery 4 by the control unit 10, wherein the above-mentioned electrical connection to the motor vehicle locking system 1 is likewise conceivable. FIG. 1c) accordingly shows that the switch 7 is closed by means of the control unit 10.

The closure element 9 may be configured as a flap. In the exemplary embodiment illustrated in FIG. 1, the closure element 9 is configured as a fuel flap of the motor vehicle 3, which likewise grants access to a fuel cap 13 in the open position. The closure element 9 may likewise by designed as a loading flap. A configuration of the closure element 9 as a flap which is intended for the auxiliary energy supply 5, such as without a dual function, is furthermore conceivable.

The closure element 9 may be configured according to a configuration (not illustrated) as a door 14 of the motor vehicle 3. As an example, this relates to the door 14 with which the aforementioned motor vehicle locking system 1 is also associated.

The closure element 9 may be designed according to a further configuration (likewise not illustrated) as a door operating element, for instance as a door handle 16 and/or door handle cup. By way of example, the auxiliary energy supply 5 is arranged in a contour of the door handle 16 and/or of the door handle cup, wherein the auxiliary energy supply 5 is only accessible when the door handle 16 is pulled, which in this case corresponds to the open position of the closure element 9.

The closure element 9 may furthermore be designed as part of a motor vehicle external element of the motor vehicle 3. One example of this is a side mirror of the motor vehicle 3, which may be brought from a folded-in (closed) position into a folded-out (open) position, wherein access to the auxiliary energy supply 5 is only enabled in the folded-out position. In the present case, motor vehicle external elements are also understood to be other elements of the motor vehicle body shell, for example trim strips, screens, covers or the like.

According to another embodiment, the closure element 9 is designed to assume a pre-latching position as an open position, wherein access to the auxiliary energy supply 5 is enabled in the pre-latching position. As an example, the closure element 9 is formed by the door 14, which is associated with the motor vehicle locking system 1. In this case, the motor vehicle locking system 1 may have the blocking unit 11, wherein the closed position of the closure element 9 corresponds to the main latching position of the door 14.

As a result of the unblocking procedure, the transfer of the closure element 9 from the closed position into the pre-latching position may be enabled via the blocking unit 11. It is the case here, for example, that the blocking unit 11 fixes the door 14 in the main latching position in the blocked state. When the emergency operation criterion is met, the main latching position is released and the door 14 may be transferred into the pre-latching position, wherein the auxiliary energy supply 5 is arranged, for example, in the door gap which appears in the pre-latching position.

The transfer of the closure element 9 from the pre-latching position into a more open position may be blocked, such as by the motor vehicle locking system 1. In the previously described exemplary embodiment, the door 14 may only be brought into the pre-latching position; however, the door 14 may not be opened further starting from the pre-latching position. The access to the interior of the motor vehicle 3 is therefore only possible when the auxiliary energy supply 5 is used to supply energy and the motorized locking function is used, which requires authentication, for example.

According to a further configuration, the closure element 9 remains in the closed position after the unblocking procedure. In this case, the closure element 9 may be transferred manually into the open position by the operator in order to grant access to the auxiliary energy supply 5. Alternatively, the closure element 9 is moved from the closed position into the open position via the blocking unit 11, for example via a motorized adjustment, for increased convenience.

The emergency operation criterion may be at least partially defined in that a state variable of the central battery is below a specified limit. The state variable is for example the central battery voltage or a variable which is dependent thereon. Accordingly, the specified limit may be a minimum voltage of the central battery.

The emergency operation criterion is further preferably at least partially defined in that the state variable of the central battery 4 is below the specified limit for a specified minimum time period. This means that the specified limit must be continuously satisfied over a minimum period so that the relevant partial criterion is regarded as having been met. In this configuration, a false triggering of the emergency operation due to temporary glitches in the monitoring of the state variable may be ruled out with a high degree of certainty.

The emergency operation criterion is further preferably at least partially defined in that the state variable follows a specified time curve. The specified time curve may represent a typical discharge curve of the central battery 4, for example.

In a further configuration, the control device 10 is designed for a sleep mode, which may be present in normal operation. The control device 10 may be transferred from the sleep mode to an active mode when the emergency operation criterion is met. In this case, the transfer to the active mode may be induced automatically, for example, so that monitoring of the state of the central battery 4 is not compulsory.

As already described, the blocking unit 11 may be part of the motor vehicle locking system 1. Likewise, however, the blocking unit 11 may also be formed independently of the motor vehicle locking system 1. In another configuration, the blocking unit 11 has a bistable blocking element, which, for unblocking purposes, is moved from a first stable position into a second stable position by an actuator. In this case, the first stable position corresponds to the blocked state and the second stable position corresponds to the unblocked state. The actuator may be advantageously adapted to the conditions in the emergency operation.

In this case, the auxiliary energy supply 5 is designed to supply electrical energy from an external energy source. To this end, the auxiliary energy supply 5 may be designed as a plug socket, terminal pair or the like. As an example, the auxiliary energy supply 5 is designed for connection to a mobile energy store, for example via a USB connector. Likewise, the auxiliary energy supply 5 may be provided for connection to a starting-aid cable.

Alternatively or additionally, however, it may be provided that the auxiliary energy supply 5 is designed to generate electrical energy from a movement of the auxiliary energy supply 5 by the operator. In this case, the auxiliary energy supply 5 has an electrical generator, which converts the movement energy into electrical energy. By way of example, the auxiliary energy supply 5 is equipped with a movement element, which is provided for the movement by the operator. Likewise, a movement of the closure element 9 may be used to generate energy.

A motorized locking function should be understood as an example to mean that an adjustment element of the motor vehicle 3 is moved directly or indirectly, for example opened or closed, and/or the adjustment element is locked or unlocked, as a result of a movement generated by the electric drive 2. The exemplary embodiment, illustrated in FIG. 1, of the motor vehicle locking system 1 has a motor vehicle lock 16 for a side door 14, which is illustrated in a partially dismantled side view in FIG. 1*a*). The motor vehicle lock 16 which is associated with the motor vehicle locking system 1 is equipped with a lock catch 17, which is pivotable about a lock catch axis 17*a,* for holding engagement with a locking part 18 and a pawl 19, which is pivotable about a pawl axis 19*a* and is associated with the lock catch 17. The locking part 17 may be a locking clip, a locking bolt or the like. By way of example, the motor vehicle lock 16 is arranged on the side door 14, whilst the locking part 18 is arranged fixed to the body of the motor vehicle 3.

The pawl 19 can be brought into an applied position, in which it holds the lock catch 17 in the illustrated locking position by means of a pawl pin 20. In a preferred configuration, the pawl, illustrated in FIG. 1*a,* can furthermore be released in a motorized manner by means of the electric drive 2. To this end, a drive motor 21 of the electric drive 2 may be connected to the pawl 19 by a drive cable 22. In FIG. 1*a*), the motorized release of the pawl 19 is a pivoting movement of the pawl 19 in the clockwise direction about the pawl axis 19*a*. The pawl 19 may essentially also be a component of a pawl system, which consists of two or more sequentially arranged pawls and is associated with the lock catch 17.

The motorized release of the lock catch 17 is triggered for example by an actuation of the door handle 16. To this end, the door handle 16 is equipped with a sensor or the like, which detects an actuation of the door handle 16 and, via a control-related connection, communicates that an actuation has been detected to a locking system control 23, which triggers the actuation of the electric drive 2. The locking system control 23 may, for example, have the control unit 10 already described.

The motor vehicle 3 may have a plurality of motor vehicle locking systems 1, for example for a plurality of doors 14, wherein it is possible to refer to the introductory explanations with regard to the possible configurations thereof.

According to a further configuration, the electric drive 2 is provided to change the locking state of the vehicle lock 16 within the context of the locking function. By way of example, the lock mechanism of the motor vehicle lock 16 can be brought into the mechanical locking states "unlocked"—UL—and "locked"—CL—and "anti-theft"—DL—in a manner known per se, wherein the pawl 25 can be released from the outside and from the inside in the locking state UL, from the inside, but not from the outside, in the locking state CL, and from neither the outside nor the inside in the locking state DL. The electric drive 2 may be designed to bring about a transfer into the locking state UL within the context of the locking function.

According to a further, preferred configuration, the electric drive 2 is provided to close the vehicle lock 16 within the context of the locking function, wherein the electric drive 2 preferably acts on the lock catch 17 and/or the locking part 18. The closing of the vehicle lock preferably brings about the motorized adjustment of the adjustment element from an open position and/or from a pre-latching position into a main latching position. The closing function implemented hereby relieves the operator of this final adjustment stage, which normally has to be carried out against high door seal pressures.

In addition to, or instead of, the explained locking function of a motor vehicle lock 16, the motor vehicle locking system 1 may likewise have a drive arrangement, wherein the drive arrangement preferably serves for motorized adjustment, such as opening and/or closing, of the adjustment element. A further example of a locking function is the motorized adjustment of operating elements, such as operating levers, door handles and interior elements and exterior elements of the motor vehicle, such as fan elements, internal mirrors, side mirrors, lighting or the like.

According to one configuration (not illustrated), the closure element 9 may correspond to the adjustment element with which the motor vehicle locking system 1 is associated.

According to a further teaching, which has independent importance, the above-mentioned motor vehicle 3, which is designed to implement the proposed method, is claimed as such. Please refer to all of the above explanations relating to the proposed method and, in particular, to the configuration of the motor vehicle 3 used here.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS 1 motor vehicle locking system
2 electric drive
3 motor vehicle
4 central battery
5 auxiliary energy supply
6 electric line
7 switch
8 closure arrangement
9 closure element
10 control device
11 lock unit
12 energy store
13 fuel cap
14 door
15 door handle
16 door handle
16 vehicle lock
7 lock catch
18 locking part
19 pawl
20 pawl pin
21 drive motor 22 drive cable
23 locking system control
25 pawl
17a lock catch axis
19a pawl axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method of operating a motor vehicle locking system, the motor vehicle locking system including an electric drive configured to provide a motorized locking function for the motor vehicle, the motor vehicle including a central battery configured to supply the electric drive with electrical energy during normal operation, the method comprising:
   assuming, by a closure element, an open position in which access to an auxiliary energy supply is blocked by the closure element;
   assuming, by the closure element, an open position in which access to the auxiliary energy supply is enabled by the closure, the auxiliary energy supply arranged in the closure element;
   monitoring, by a control unit, to check whether an emergency operation criterion is met;
   blocking, by a blocking unit, the closure element in the closed position so that the closure element is in a blocked state; and
   unblocking the closure element by actuating the control unit to unblock the closure element starting from the blocked state, in response to the emergency operation criterion being met;
   wherein the auxiliary energy supply is either a plug socket configured for connection to an external energy source to supply electrical energy from the external energy source or an electrical generator provided with a movement element, configured generate electrical energy in response to movement of the movement element by an operator.

2. The method of claim 1, wherein the unblocking step is accomplished by providing energy stored in an electrical energy store to the blocking unit so that the blocking unit is unblocked by means of the energy stored in the energy store.

3. The method of claim 2, further comprising:
   charging, by the control unit during normal operation, the electrical energy store, wherein the electrical energy store is configured to be rechargeable.

4. The method of claim 1, further comprising:
   electrically connecting, by the control unit, the auxiliary energy supply to at least one of the central battery and the motor vehicle locking system, wherein the blocking step includes electrically disconnecting the auxiliary energy supply from the central battery and the motor vehicle locking system.

5. The method of claim 1, wherein the assuming the open position step includes the closure element assuming a pre-latching position as the open position, and the unblocking step includes the blocking element transferring the closure element from the closed position into the pre-latching position.

6. The method of claim 5, further comprising:

blocking the closure element to prevent the closure element from moving from the pre-latching position to a more open position.

7. The method of claim 1, further comprising:

maintaining a position of the closure element so that the closure element remains in the closed position, wherein the maintaining step is accomplished after the unblocking step.

8. The method of claim 1, further comprising:

the emergency operation criterion being met, wherein the emergency operation criterion is at least partially based on a state variable of the central battery falling below a specified limit.

9. The method of claim 8, wherein the emergency operation criterion being met step includes the state variable falling below the specified limit for a specified minimum time period and/or the state variable follows a specified time curve.

10. The method of claim 1, wherein the blocking unit includes a bistable blocking element, and wherein the unblocking step includes moving the bistable blocking element from a first stable position into a second stable position.

11. The method of claim 1, further comprising:

actuating a motor vehicle lock, wherein the motor vehicle locking system includes the motor vehicle lock and the motor vehicle lock is configured to lock and unlock an adjustment element of the motor vehicle, wherein the motor vehicle lock includes a lock catch, configured for holding engagement with a locking part, and a pawl associated with the lock catch.

12. The method of claim 11, further comprising:

changing, by the electric drive, a locking state of the motor vehicle lock to perform a locking function.

13. The method of claim 12, wherein the actuating step includes actuating the electric drive to close the vehicle lock to perform the locking function.

14. The method of claim 1, further comprising:

adjusting the adjustment element of the motor vehicle by actuating the electric drive to provide motorized adjustment of the adjustment element of the motor vehicle.

15. A motor vehicle configured to perform the method of claim 1.

16. The motor vehicle of claim 15, wherein the motor vehicle includes an electrical energy store and the electrical energy store includes a capacitor.

17. The motor vehicle of claim 15, wherein the closure element is a door or a door operating element.

18. The motor vehicle of claim 16, wherein the capacitor is comprised of at least one of a ceramic capacitor and a double layer capacitor.

19. The method of claim 1, further comprising:

moving the closure element, by the blocking unit, from the closed position to the pre-latching position, wherein the moving step is accomplished after the unblocking step.

* * * * *